(12) United States Patent
Choi

(10) Patent No.: US 11,606,610 B2
(45) Date of Patent: Mar. 14, 2023

(54) DISPLAY DEVICE AND METHOD FOR OPERATING SAME

(71) Applicant: LG ELECTRONICS INC., Seoul (KR)

(72) Inventor: Jinyoung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/280,597

(22) PCT Filed: Feb. 18, 2019

(86) PCT No.: PCT/KR2019/001921
§ 371 (c)(1),
(2) Date: Mar. 26, 2021

(87) PCT Pub. No.: WO2020/171245
PCT Pub. Date: Aug. 27, 2020

(65) Prior Publication Data
US 2021/0344994 A1    Nov. 4, 2021

(51) Int. Cl.
*H04N 21/443* (2011.01)
*H04N 21/4363* (2011.01)
*H04N 21/485* (2011.01)

(52) U.S. Cl.
CPC ............ *H04N 21/4432* (2013.01); *H04N 21/43635* (2013.01); *H04N 21/485* (2013.01)

(58) Field of Classification Search
CPC ............ H04N 21/4363; H04N 21/422; H04N 21/442; H04N 21/443; H04N 21/45; H04N 21/485; H04N 21/4432; H04N 21/43635
See application file for complete search history.

(56) References Cited

U.S. PATENT DOCUMENTS

| | | | | |
|---|---|---|---|---|
| 2008/0270635 A1* | 10/2008 | Nakahama | ............. | G09G 5/006 710/8 |
| 2009/0141181 A1* | 6/2009 | Yang | ........................ | H04N 5/63 348/725 |
| 2010/0079597 A1* | 4/2010 | Stokes | ................... | H04H 60/32 348/184 |
| 2010/0110292 A1* | 5/2010 | Oh | .......................... | G09G 5/006 348/554 |
| 2011/0047394 A1* | 2/2011 | Sato | ..................... | H04N 21/485 713/320 |

(Continued)

FOREIGN PATENT DOCUMENTS

| | | |
|---|---|---|
| JP | 2009-141720 A | 6/2009 |
| KR | 10-2009-0074860 A | 7/2009 |
| WO | WO 2015/062471 A1 | 5/2015 |

*Primary Examiner* — Pinkal R Chokshi
(74) *Attorney, Agent, or Firm* — Birch, Stewart, Kolasch & Birch, LLP

(57) ABSTRACT

A display device according to an embodiment of the present invention can comprise: a display unit; an external device interface unit for exchanging information with a set-top box; and a control unit which receives set-top box information from the set-top box by means of the external device interface unit, determines whether or not a high definition multimedia interface-consumer electronics control (HDMI-CEC) function is turned on on the basis of the received set-top box information, and automatically turns on an HDMI-CEC function of the display device if the HDMI-CEC function is turned on.

16 Claims, 16 Drawing Sheets

(56) References Cited

U.S. PATENT DOCUMENTS

| | | | |
|---|---|---|---|
| 2012/0075538 A1 | 3/2012 | Okuda | |
| 2012/0133833 A1* | 5/2012 | Yoshida | H04N 5/63 |
| | | | 348/730 |
| 2012/0249890 A1* | 10/2012 | Chardon | H04N 21/43615 |
| | | | 348/734 |
| 2014/0111318 A1* | 4/2014 | Arling | G08C 23/04 |
| | | | 340/12.22 |
| 2014/0222862 A1* | 8/2014 | Arling | H04N 21/4222 |
| | | | 707/769 |
| 2014/0337879 A1* | 11/2014 | Arling | G06Q 30/0267 |
| | | | 725/32 |
| 2015/0228266 A1* | 8/2015 | Higuchi | G10K 11/16 |
| | | | 381/71.11 |
| 2016/0080806 A1* | 3/2016 | Ozeki | H04H 60/32 |
| | | | 725/14 |
| 2017/0048577 A1 | 2/2017 | Chiou et al. | |
| 2017/0193962 A1* | 7/2017 | Yoon | G06F 3/147 |
| 2017/0238050 A1 | 8/2017 | Yang et al. | |
| 2018/0143838 A1* | 5/2018 | Seo | G06F 1/263 |
| 2019/0348010 A1* | 11/2019 | Oh | H04N 21/43632 |
| 2021/0037286 A1* | 2/2021 | Conklin | H04N 21/44222 |

\* cited by examiner

| | (710) Vendor Name | | | | | | | | (720) Product Description (model name) | | | | | | (730) extra info 731 732 733 734 | | | | | | | | (740) Source information |
|---|---|---|---|---|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| L | G | U | P | L | U | S | | S | 6 | 0 | U | P | I | | F | 1 | 0 | 0 | | | | | | 1 | column 16: space prefix
column 17: prec fix
column 18: CESC on /off
column 19: Msg Cop pr r o f f i l e
column 25: reserved

| UI Command Id | Key |
|---|---|
| 0x01 | Up |
| 0x02 | Dowm |
| 0x03 | Left |
| 0x04 | Right |
| 0x0D | Exit |
| 0x20 ~ 0x29 | Numbers 0 ~ 9 |
| 0x2B | Enter |
| 0x30 | Channel Up |
| 0x31 | Channel Down |
| 0x32 | Previous Channel |
| 0x44 | Play |
| 0x45 | Stop |
| 0x46 | Pause |
| 0x48 | Rewind |
| 0x49 | Fast forward |

1100

```
         NOTIFY * HTTP/1.1\r\n
1101 ─── Host: 239.255.255.250:1900\r\n
1103 ─── NT: urn:lguplus:device:iptvstb:1\r\n
1105 ─── NTS: ssdp:alive\r\n
1107 ─── Location: http://192.168.0.2:20202\r\n
1109 ─── USN: uuid:efc19dde-e698-4b03-99a6-59f49e01e3c::urn:lguplus:device:iptvstb:1\r\n
1111 ─── Cache-Control: max-age=180\r\n
1113 ─── Server: Android/5.0UPnP/1.0\r\n
         \r\n
```

```
        M-SEARCH * HTTP/1.1\r\n
1301 —  Host: 239.255.255.250:1900\r\n
1303 —  MAN: ssdp:discover\r\n
1305 —  MX: max-age=180\r\n
1307 —  ST: urn:lguplus:device:iptvstb:1\r\n
        \r\n
```

```
        HTTP/1.1 200 OK\r\n
1311 —  Host: 239.255.255.250:1900\r\n
1313 —  ST: urn:lguplus:device:iptvstb:1\r\n
1315 —  DATE: Wed May 23 10:10:00 2018 GMT\r\n
1317 —  Location: http://192.168.0.2:20202\r\n
1319 —  USN: uuid:efc19dde-e698-4b03-99a6-59f49e01e3c::urn:lguplus:device:iptvstb:1\r\n
1321 —  Cache-Control: max-age=180\r\n
1323 —  Server: Android/5.0UPnP/1.0\r\n
        \r\n
```

| Division | Prefix | version | Type | Command | Response Code | BodyLength |
|---|---|---|---|---|---|---|
| Length | 3 | 2 | 1 | 4 | 4 | 00000240 |
| Value | SSC | 01 | 0 : Request<br>1 : Response | 0001 | 0000 : OK<br>0001 : Not OK | 9 |
| Description | | | | 0001 : Send Key<br>0002 : Get Current CH | If type is 0, 0000 | It is length if body is present |

Column labels: 1410, 1420, 1430, 1440, 1450, 1460

FIG. 15

· Request

1510 —

| Prefix | version | Type | Command | Response Code | BodyLength | Body |
|---|---|---|---|---|---|---|
| SSC | 01 | 0 | 0001 | 0000 | 00000016 | KEY_ENTER |

· Response

1530 —

| Prefix | version | Type | Command | Response Code | BodyLength |
|---|---|---|---|---|---|
| SSC | 01 | 1 | 0001 | 0000 | 00000000 |

FIG. 16

· Request

1610 —

| Prefix | version | Type | Command | Response Code | BodyLength | Body |
|---|---|---|---|---|---|---|
| SSC | 01 | 0 | 0002 | 0000 | 00000000 | KEY_ENTER |

· Response

1630 —

| Prefix | version | Type | Command | Response Code | BodyLength | Body |
|---|---|---|---|---|---|---|
| SSC | 01 | 1 | 0002 | 0000 | 00000032 | CH_NUMBER=7&CH_NAME=KBS2 |

DISPLAY DEVICE AND METHOD FOR OPERATING SAME

CROSS-REFERENCE TO RELATED APPLICATIONS

This Application is the National Phase of PCT International Application No. PCT/KR2019/001921 filed on Feb. 18, 2019, which is hereby expressly incorporated by reference into the present application.

BACKGROUND OF THE INVENTION

Field of the Invention

The present disclosure relates to a display device and, more particularly, to a display device for automatically setting a set-top box and a high definition multimedia interface-consumer electronics control (HDMI-CEC) function.

Discussion of the Related Art

Digital TV services using wired or wireless communication networks are becoming common. Digital TV service can provide a variety of services that could not be provided in the conventional analog broadcasting service.

For example, IPTV (Internet Protocol Television), which is a type of digital TV service, and smart TV service provide bidirectionality that allows a user to actively select a type of viewing the program and viewing time. IPTV, smart TV service may provide a variety of additional services, such as Internet search, home shopping, and online games based on this bidirectionality.

When a conventional TV is used in a state of being connected with a set-top box, a remote controller of the TV and a remote controller of the set-top box have been simultaneously used or operations of devices has been controlled after setting a unified remote controller.

However, when a unified power key is selected through the remote controller, the power states of the TV and the set-top box are inconsistent, causing inconvenience in operation of the device.

In addition, when external input of the TV is switched to another external device other than the set-top box, inconvenience was caused due to inexperience in external input switching operation.

SUMMARY OF THE INVENTION

The present disclosure is to provide a display device capable of automatically recognizing a set-top box to make a power state of the set-top box and a power state of the display device consistent with each other.

The present disclosure is to provide a display device capable of automatically switching external input of the display device to a set-top box when power of the set-top box and the display device are turned on.

A display device according to an embodiment of the present disclosure can determine whether a HDMI-CEC function of a set-top box is turned on based on information received from the set-top box and automatically turn on a HDMI-CEC function of the display device when the HDMI-CEC function of the set-top box is turned on.

A display device according to an embodiment of the present disclosure can automatically turn on power of the display device when power of a set-top box is turned on in a state in which a HDMI-CEC function of the display device is turned on, and automatically turn off power of the display device when power of the set-top box is turned off.

A display device according to an embodiment of the present disclosure can automatically switch external input to a set-top box when power of the set-top box is turned on.

Effect of the Invention

According to various embodiments of the present disclosure, since there is no fear that power operations of a set-top box and a display device are inconsistent, it is possible to greatly improve convenience in user's device operation.

According to various embodiments of the present disclosure, when power of a set-top box is turned on, since external input is automatically switched to the set-top box, it is possible to provide improved user experience to a user who is inexperienced in operation of switching external input.

BRIEF DESCRIPTION OF THE DRAWINGS

FIG. 8 is a view illustrating an example of operations capable of controlling a set-top box when the value of a profile field included in information on the set-top box is 1 according to an embodiment of the present disclosure.

FIG. 13a is a view illustrating the content of a M-SEARCH message according to an embodiment of the present disclosure.

FIG. 13b is a view illustrating the configuration of a M-SEARCH response message.

FIG. 14 is a view illustrating the configuration of a message exchanged between a display device and a set-top box according to an embodiment of the present disclosure.

FIGS. 15 and 16 are views illustrating detailed examples of the message of FIG. 14.

DETAILED DESCRIPTION OF THE EMBODIMENTS

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present disclosure, for example, as an artificial display device that adds a computer supporting function to a broadcast receiving function, can have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

Figure 1:
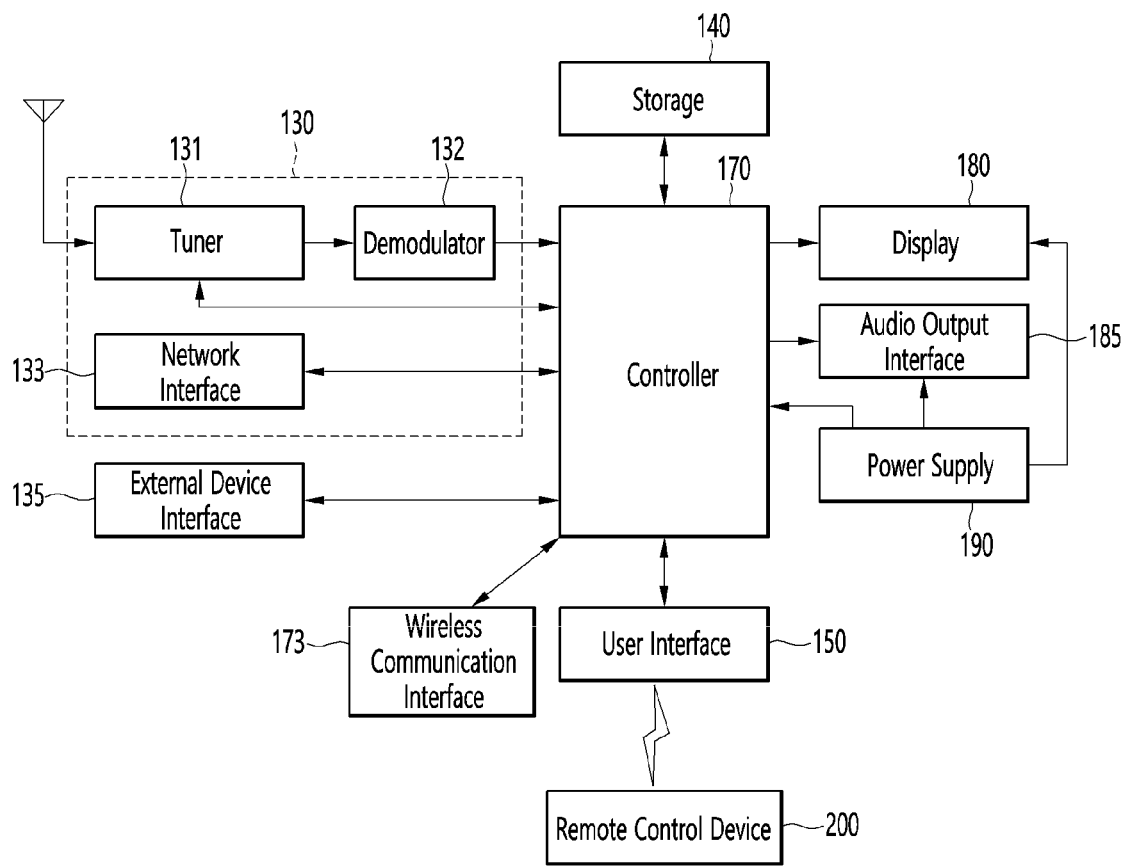
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast receiver 130, an external device interface 135, a storage 140, a user interface 150, a controller 170, a wireless communication interface 173, a display 180, an audio output interface 185, and a power supply 190.

The broadcast receiver 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The external device interface 135 can receive an application or an application list in an adjacent external device and deliver it to the controller 170 or the storage 140.

The external device interface 135 can provide a connection path between the display device 100 and an external device. The external device interface 135 can receive at least one an image or audio output from an external device that is wirelessly or wiredly connected to the display device 100 and deliver it to the controller 170. The external device interface 135 can include a plurality of external input terminals. The plurality of external input terminals can include an RGB terminal, at least one High Definition Multimedia Interface (HDMI) terminal, and a component terminal.

An image signal of an external device input through the external device interface 135 can be output through the display 180. A voice signal of an external device input through the external device interface 135 can be output through the audio output interface 185.

An external device connectable to the external device interface 135 can be one of a set-top box, a Blu-ray player, a DVD player, a game console, a sound bar, a smartphone, a PC, a USB Memory, and a home theater system, but this is just exemplary.

The network interface 133 can provide an interface for connecting the display device 100 to a wired/wireless network including the Internet network. The network interface 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface 133 can access a predetermined webpage through an accessed network or another network linked to the accessed network. In other words, the network interface 133 can transmit or receive data to or from a corresponding server by accessing a predetermined webpage through the network.

Then, the network interface 133 can receive contents or data provided from a content provider or a network operator. In other words, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an Internet or content provider or a network operator.

The network interface 133 can select and receive a desired application among applications open to the air, through network.

The storage 140 can store signal-processed image, voice, or data signals stored by a program in order for each signal processing and control in the controller 170.

Additionally, the storage 140 can perform a function for temporarily storing image, voice, or data signals output from the external device interface 135 or the network interface 133 and can store information on a predetermined image through a channel memory function.

The storage 140 can store an application or an application list input from the external device interface 135 or the network interface 133.

The display device 100 can play content files (for example, video files, still image files, music files, document files, application files, and so on) stored in the storage 140 and provide them to a user.

The user interface 150 can deliver signals input by a user to the controller 170 or deliver signals from the controller 170 to a user. For example, the user interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user interface 150 can deliver, to the controller 170, control signals input from local keys (not illustrated) such as a power key, a channel key, a volume key, and a setting key.

Image signals that are image-processed in the controller 170 can be input to the display 180 and displayed as an image corresponding to corresponding image signals. Additionally, image signals that are image-processed in the controller 170 can be input to an external output device through the external device interface 135.

Voice signals processed in the controller 170 can be output to the audio output interface 185. Additionally, voice signals processed in the controller 170 can be input to an external output device through the external device interface 135.

Besides that, the controller 170 can control overall operations in the display device 100.

Additionally, the controller 170 can control the display device 100 by a user command or internal program input through the user interface 150 and download a desired application or application list into the display device 100 in access to network.

The controller 170 can output channel information selected by a user together with processed image or voice signals through the display 180 or the audio output interface 185.

Additionally, according to an external device image playback command received through the user interface 150, the controller 170 can output image signals or voice signals of an external device such as a camera or a camcorder, which are input through the external device interface 135, through the display 180 or the audio output interface 185.

Moreover, the controller 170 can control the display 180 to display images and control broadcast images input through the tuner 131, external input images input through the external device interface 135, images input through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content input from the outside, and the content can be in various formats such as broadcast images, external input images, audio files, still images, accessed web screens, and document files.

The wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The display 180 can convert image signals, data signals, or on-screen display (OSD) signals, which are processed in the controller 170, or images signals or data signals, which are received in the external device interface 135, into R, G, and B signals to generate driving signals.

Meanwhile, the display device 100 illustrated in FIG. 1 is just one embodiment of the present disclosure and thus, some of the components illustrated can be unified, added, or omitted according to the specification of the actually implemented display device 100.

In other words, if necessary, two or more components can be unified into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents input from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output interface 185.

Figure 2:
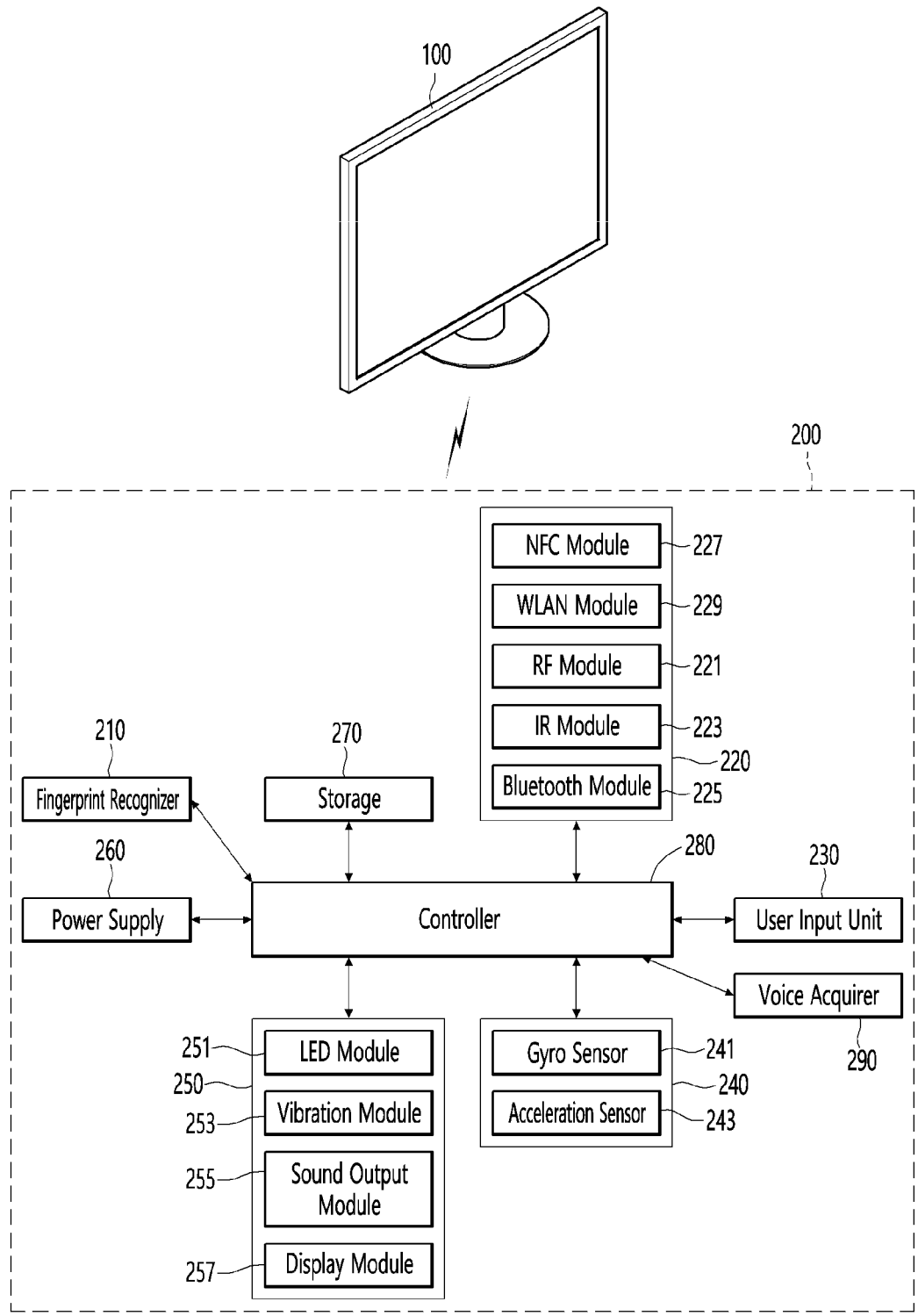
FIG. 2 is a block diagram illustrating a remote control device according to an embodiment of the present disclosure.
Figure 3:
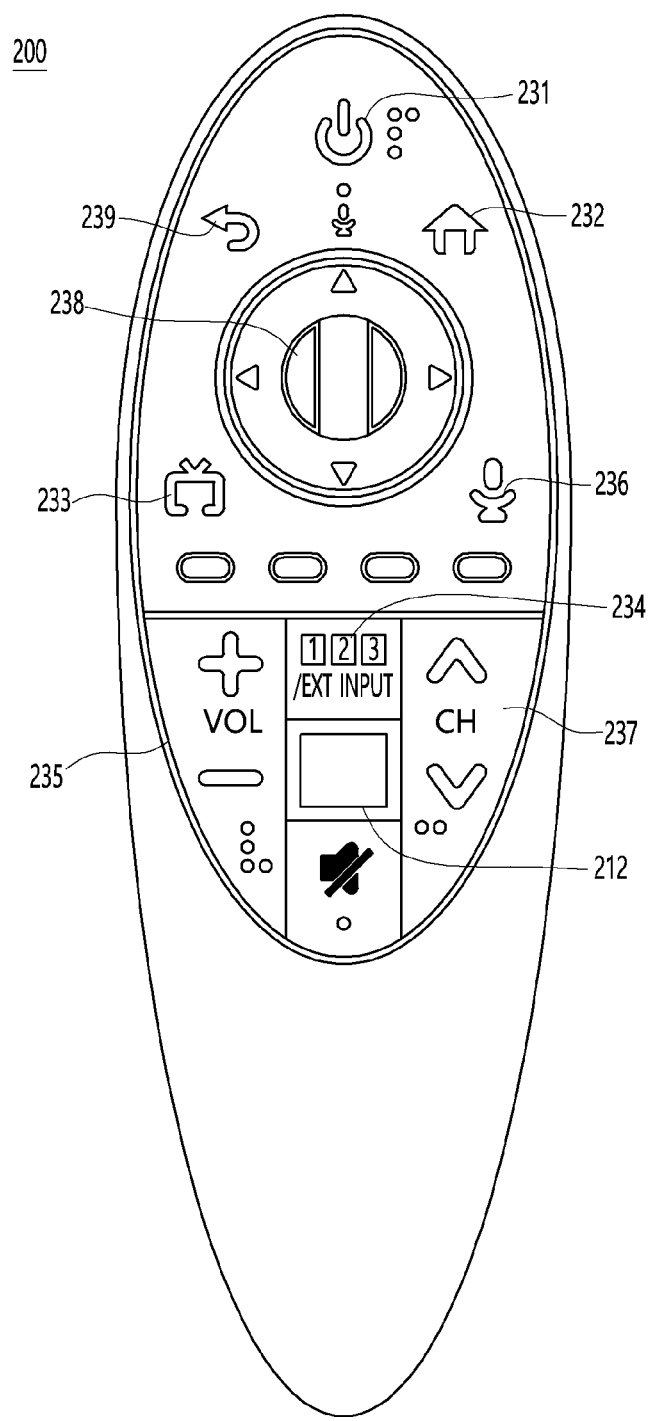
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device 200 according to an embodiment of the present disclosure.

First, referring to FIG. 2, a remote control device 200 can include a fingerprint recognizer 210, a wireless communication interface 220, a user input interface 230, a sensor 240, an output interface 250, a power supply 260, a storage 270, a controller 280, and a voice acquirer 290.

Referring to FIG. 2, the wireless communication interface 220 transmits/receives signals to/from an arbitrary any one of display devices according to the above-mentioned embodiments of the present disclosure.

The remote control device 200 can include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The home button 232 can be a button for moving to the home screen of the display device 100. The live button 233 can be a button for displaying live broadcast programs. The external input button 234 can be a button for receiving an external input connected to the display device 100. The voice adjustment button 235 can be a button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

FIG. 2 will be described again.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output interface 250 can output image or voice signals corresponding to manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 225.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to control of the remote control device 200. The controller 280 can transmit a signal corresponding to a predetermined key manipulation of the user input interface 230 or a signal corresponding to movement of the remote control device 200 sensed by the sensor 240 to the display device 100 through the wireless communication interface 225.

Additionally, the voice acquirer 290 of the remote control device 200 can obtain voice.

The voice acquirer 290 can include at least one microphone 291 and obtain voice through the microphone 291.

Figure 4:
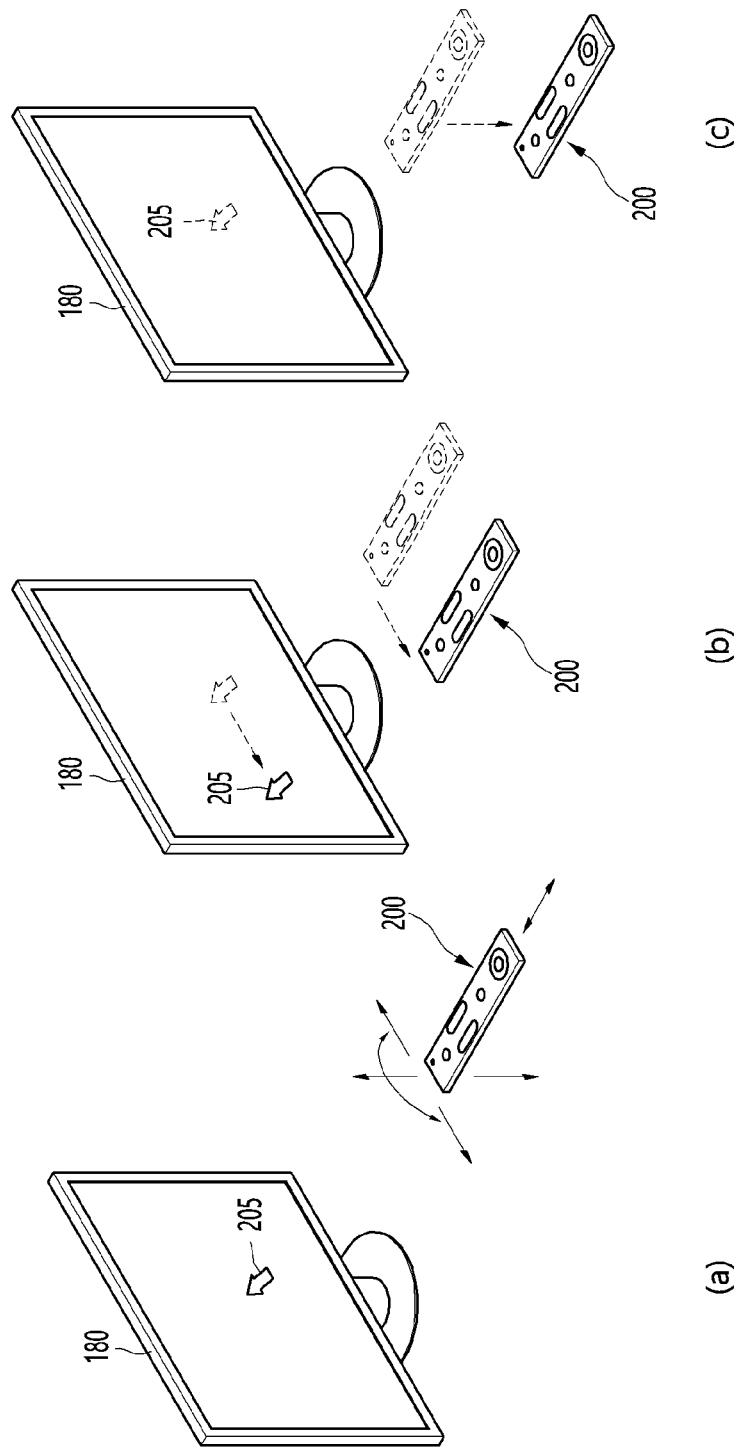
FIG. 4 is a view of utilizing a remote control device according to an embodiment of the present disclosure.

Next, FIG. 4 is illustrated.

FIG. 4 is a view of utilizing a remote control device according to an embodiment of the present disclosure.

FIG. 4(a) illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote control device.

FIG. 4(b) illustrates that if a user moves the remote control device 200, the pointer 205 displayed on the display 180 of the display device 100 is moved to the left according to the movement of the remote control device 200.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(c) illustrates that while a specific button in the remote control device 200 is pressed, a user moves the remote control device 200 away from the display 180. Thus, a selection area in the display 180 corresponding to the pointer 205 can be zoomed in and displayed larger.

On the contrary, when the user moves the remote control device 200 to approach the display 180, the selection area in the display 180 corresponding to the pointer 205 may be zoomed out and reduced.

On the other hand, if the remote control device 200 is moved away from the display 180, a selection area can be zoomed out and if the remote control device 200 is moved closer to the display 180, a selection area can be zoomed in.

Additionally, if a specific button in the remote control device 200 is pressed, recognition of a vertical or horizontal movement can be excluded. In other words, if the remote control device 200 is moved away from or closer to the display 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

Next, a method of operating a system according to an embodiment of the present disclosure will be described with reference to FIG. 5.

Figure 5:
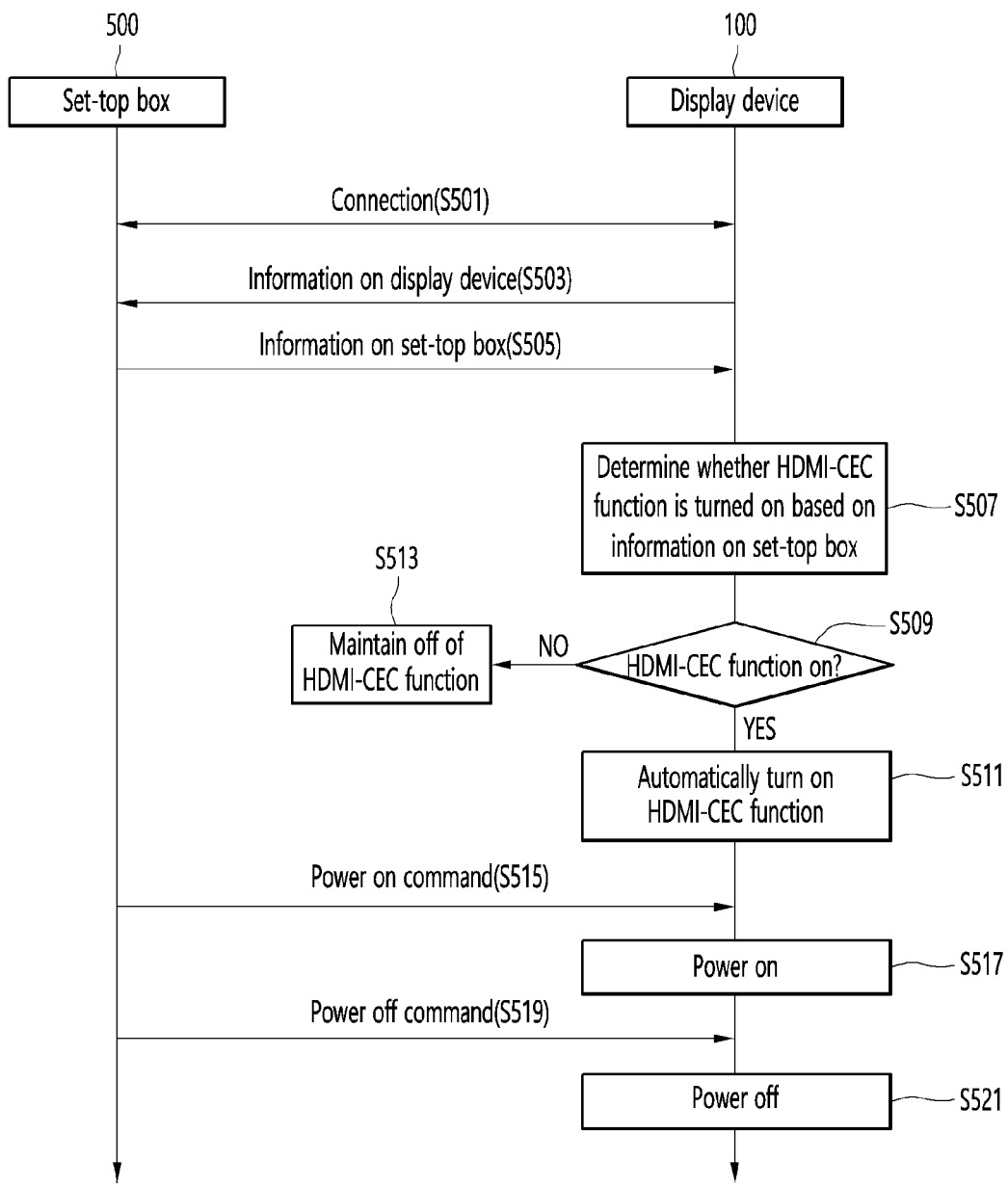
FIG. 5 is a ladder diagram for a method of operating a system according to an embodiment of the present disclosure.

FIG. 5 is a ladder diagram for a method of operating a system according to an embodiment of the present disclosure.

Referring to FIG. 5, the display device 100 and the set-top box 500 are connected with each other (S501).

In an embodiment, the display device 100 and the set-top box 500 may be connected through the external device interface 135. Specifically, the set-top box 500 may be connected with the display device 100 through a HDMI terminal provided in the external device interface 135.

The controller 170 of the display device 100 transmits information on the display device 100 to the set-top box 500 through the external device interface 135 (S503).

In an embodiment, the information on the display device 100 may be extended display identification data (EDID).

The information on the display device 100 may include the manufacturer of the display device 100, the specification of the display device 100, resolution supported by the display device 100, and information on whether automatic activation of a HDMI-CEC (Consumer Electronics Control) function of the display device 100 is supported.

The HDMI-CEC function is designed to control an external device connected to the remote control device 200 of the display device 100 through the HDMI terminal.

The information on the display device 100 may include information indicating whether the display device 100 is capable of automatically turning on the HDMI-CEC function.

This will be described with reference to FIG. 6.

Figures 6, 7:
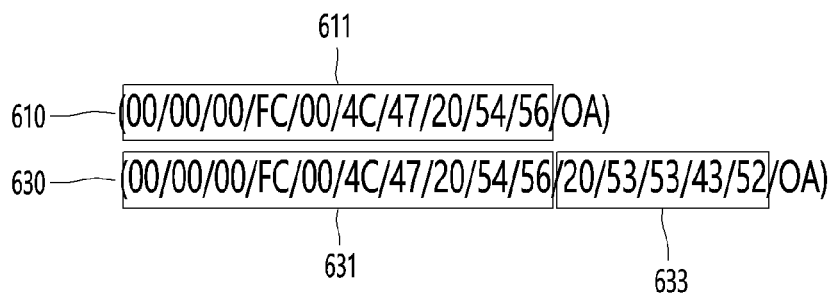
FIG. 6 is a view illustrating the shapes of an EDID transmitted from a conventional display device to a set-top box and an EDID transmitted from a display device according to an embodiment of the present disclosure to a set-top box.
FIG. 7 is a view illustrating an example of set-top box information transmitted from a set-top box to a display device, according to an embodiment of the present disclosure.

FIG. 6 is a view illustrating the shapes of an EDID transmitted from a conventional display device to a set-top box and an EDID transmitted from a display device according to an embodiment of the present disclosure to a set-top box.

A conventional EDID 610 included only the manufacturer, specification and resolution of the display device 100.

However, an EDID 630 according to an embodiment of the present disclosure may further include information 633 indicating whether the display device 100 is capable of automatically turning on the HDMI-CEC function, in addition to the manufacturer, specification and resolution 631 of the display device 100.

FIG. 5 will be described again.

The controller 170 of the display device 100 receives set-top box information from the set-top box 500 through the external device interface 135 (S505).

In an embodiment, the set-top box information may include the manufacturer of the set-top box 500, the model name of the set-top box 500 and extra information of the set-top box 500.

The extra information of the set-top box may include information indicating whether the HDMI-CEC function of the set-top box 500 is turned on or information indicating whether the HDMI-CEC function is turned off.

The set-top box 500 may transmit the extra information to the display device 100, when information indicating whether the HDMI-CEC function is automatically activated is included in the information on the display device 100.

This will be described with reference to FIG. 7.

FIG. 7 is a view illustrating an example of set-top box information transmitted from a set-top box to a display device, according to an embodiment of the present disclosure.

Referring to FIG. 7, information 700 on the set-top box 500 may include a vendor name 710 of the set-top box 500, a model name 720 of the set-top box 500, extra information 730 of the set-top box 500 and source information 750.

The vendor name 710 of the set-top box 500 may have a size of 8 bytes (first to eighth fields).

Each field has a size of 1 byte.

The model name 720 of the set-top box 500 may have a size of 6 bytes (ninth to fourteenth fields).

The extra information 730 of the set-top box 500 may have a size of 4 bytes (sixteenth to nineteenth fields). For reference, a fifteenth field is a space field for distinguishing between the model name 720 and the extra information 730.

The extra information 730 of the set-top box 500 may include a prefix field 731, a CEC function field 732, a profile field 733 and a reserved field 734.

The prefix field 731 may be a field for identifying that the extra information 730 is present in the information 700 on the set-top box 500.

The CEC function field 732 may be a field indicating whether the HDMI-CEC function of the set-top box 500 is turned on or off.

When the value of the CEC function field 732 is 0, this may indicate that the HDMI-CEC function of the set-top box 500 is turned off.

When the value of the CEC function field 732 is 1, this may indicate that the HDMI-CEC function of the set-top box 500 is turned on.

The profile field 733 may be a field for identifying the function of the set-top box 500 supported through the HDMI-CEC function.

When the value of the profile field 733 is 0, this may indicate that power control operation of the set-top box 500 is supported through the HDMI-CEC function.

When the value of the profile field 733 is 1, this may indicate that various operations of the set-top box 500 are supported using a plurality of buttons provided in the remote control device 200 of the display device 100 through the HDMI-CEC function.

This will be described with reference to FIG. 8.

FIG. 8 is a view illustrating an example of operations capable of controlling a set-top box when the value of a profile field included in information on the set-top box is 1 according to an embodiment of the present disclosure.

Referring to FIG. 8, a key table 800 in which command IDs correspond to a plurality of keys is shown.

The command ID may be a key code value corresponding to a key (button) provided in the remote control device 200.

When the value of the profile field 733 included in the information 700 on the set-top box 500 is 1, operation of the set-top box 500 may be controlled using the plurality of keys provided in the remote control device 200 of the display device 100 through the HDMI-CEC function.

For example, when the command IDs are 0x01 to 0x04, the keys corresponding thereto may be an up key, a down key, a left key and a right key.

When the command ID is 0x0D, the key corresponding thereto may be an Exit key.

When the command IDs are 0x20 to 0x29, the keys corresponding thereto may be numbers 0 to 9.

When the command ID is 0x2B, the key corresponding thereto may be an Enter key.

When the command ID is 0x30, the key corresponding thereto may be a channel up key.

When the command ID is 0x31, the key corresponding thereto may be a channel down key.

When the command ID is 0x32, the key corresponding thereto may be a previous channel key for moving to a previous channel.

When the command ID is 0x44, the key corresponding thereto may be a play key for playing back content.

When the command ID is 0x45, the key corresponding thereto may be a stop for stopping playing of the content.

When the command ID is 0x46, the key corresponding thereto may be a pause for pausing playing of the content.

When the command ID is 0x48, the key corresponding thereto may be a rewind key for rewinding the content.

When the command ID is 0x49, the key corresponding thereto may be a fast forward key for fast forwarding the content.

FIG. 5 will be described again.

The controller 170 of the display device 100 may determine whether the connected set-top box 500 is included in a white list based on set-top box information, before performing step S507.

The white list may include model names of set-top boxes supportable by the display device 100.

The controller 170 may automatically recognize the set-top box 500 through the model name of the set-top box, when the set-top box 500 is included in the white list.

The controller 170 may fail to recognize the set-top box 500 through the model name of the set-top box, when the set-top box 500 is not included in the white list.

When the set-top box 500 is automatically recognized, a unified remote control setting procedure of controlling both the display device 100 and the set-top box 500 may be performed through the remote control device 200.

The controller 170 of the display device 100 determines whether the HDMI-CEC function of the set-top box 500 is turned on, based on the set-top box information (S507).

In an embodiment, the controller 170 may parse the value of the CEC function field 732 included in the information 700 on the set-top box 500 received from the set-top box 500, read the parsed value, and determine whether the HDMI-CEC function of the set-top box 500 is turned on.

The controller 170 may determine that the HDMI-CEC function of the set-top box 500 is turned on, when the value of the CEC function field 732 is 1.

Meanwhile, the controller 170 may display an image based on image data received from the set-top box 500 through the display 180.

The image may include a setting menu for controlling the function of the set-top box 500, and the setting menu may include an item for turning on or off the HDMI-CEC function of the set-top box 500. This will be described with reference to FIG. 9.

Figure 9:
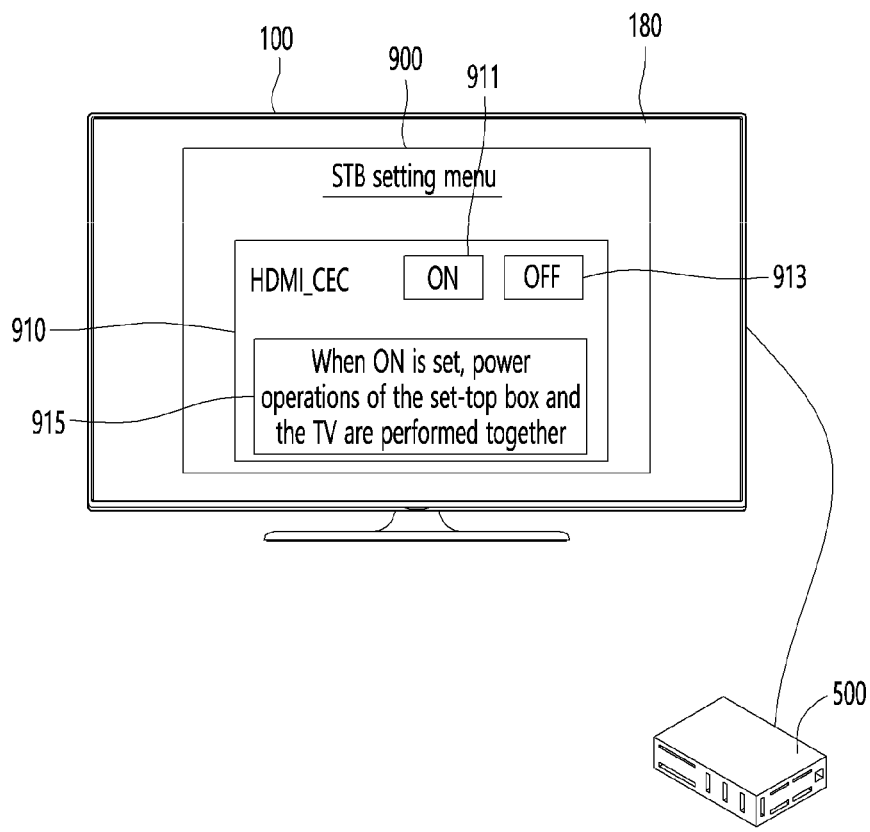
FIG. 9 is a view illustrating an example of a UI screen capable of being performed on a setting menu of a set-top box when a HDMI-CEC function is turned on, according to an embodiment of the present disclosure.

FIG. 9 is a view illustrating an example of a UI screen capable of being performed on a setting menu of a set-top box when a HDMI-CEC function is turned on, according to an embodiment of the present disclosure.

Referring to FIG. 9, when the display device 100 and the set-top box 500 are connected, the display device 100 may display a setting menu 900 for setting the function of the set-top box 500 on the display 180.

The setting menu 900 may include a HDMI-CEC item 910 capable of turning on or off the HDMI-CEC function of the set-top box 500.

The HDMI-CEC ITEM 910 may include an ON button 911 for turning on the HDMI-CEC function of the set-top box 500 and an OFF button 913 for turning off the HDMI-CEC function.

In addition, the HDMI-CEC ITEM 910 may further include a guide 915 <When the HDMI-CEC function is turned on, power operations of the set-top box and the TV are performed together>.

That is, the guide 915 may include text indicating that power operations of the set-top box 500 and the display device 100 are equally performed when the HDMI-CEC function of the set-top box 500 is turned on.

A user may easily recognize that the power operations of the set-top box 500 and the display device 100 can be controlled through the guide 915.

Meanwhile when the ON button 911 is selected through the HDMI-CEC ITEM 910, the HDMI-CEC function of the set-top box 500 may be activated, and the HDMI-CEC function of the display device 100 may be automatically activated.

In addition, when the ON button 911 is selected through the HDMI-CEC ITEM 910, the set-top box 500 may set the value of the CEC function field 732 of the set-top boxy information 700 to 1.

FIG. 5 will be described again.

The controller 170 of the display device 100 automatically turns on the HDMI-CEC function thereof (S511), upon determining that the HDMI-CEC function is turned on (S509).

When power of the set-top box 500 is turned on in a state in which the HDMI-CEC function is turned on, the controller 170 may automatically turn on power of the display device.

When the power of the set-top box 500 is turned on, the display device 100 may receive a power on command from the set-top box 500 through the HDMI terminal.

The controller 170 of the display device 100 may turn on the power of the display device according to the received power on command.

This will be described later.

Meanwhile, the controller 170 of the display device 100 maintains OFF of the HDMI-CEC function (S513), upon determining that the HDMI-CEC function is turned off (S509).

When the value of the CEC function field 732 is 0, the controller 170 may determine that the HDMI-CEC function of the set-top box 500 is turned off and thus maintain OFF of the HDMI-CEC function of the display device 100.

Meanwhile, the controller 170 of the display device 100 receives the power on command from the set-top box 500 in a state in which the HDMI-CEC function is turned on (S515), and turns on the power of the display device 100 according to the received power on command (S517).

That is, the set-top box 500 may receive the power on command for turning on the power of the set-top box 500 through the remote control device 200.

The set-top box 500 may turn on the power thereof according to the received power on command while transmitting the power on command to the display device 100, and, accordingly, the power of the display device 100 may be automatically turned on.

Meanwhile, when the powers of the set-top box 500 and the display device 100 are turned on, the controller 170 of the display device 100 may automatically display the image output by the set-top box 500 on the display 180.

That is, when the powers of the set-top box 500 and the display device 100 are turned on, switching to external input (set-top box) may be automatically performed.

The set-top box 500 may transmit a message <active source> to the display device 100. The <active source> message may be a message for requesting switching of external input to the set-top box 500.

The controller 170 of the display device 100 receives a power off command from the set-top box 500 in a state in which the HDMI-CEC function is turned off (S519), and turns off the power of the display device 100 (S521).

That is, the set-top box 500 may receive a power off command for turning off the power of the set-top box 500 through the remote control device 200.

The set-top box 500 may turn off the power thereof according to the received power off command and, at the same time, transmit the power off command to the display device 100. Accordingly, the power of the display device 100 may be automatically turned off.

The user may simultaneously control the power operations of the set-top box 500 and the display device 100 using the remote control device 200 of the display device 100.

Therefore, it is possible to solve inconvenience due to inconsistency in power state between the set-top box 500 and the display device 100 when the unified power key provided in the remote control device 200 is manipulated.

Figure 10:
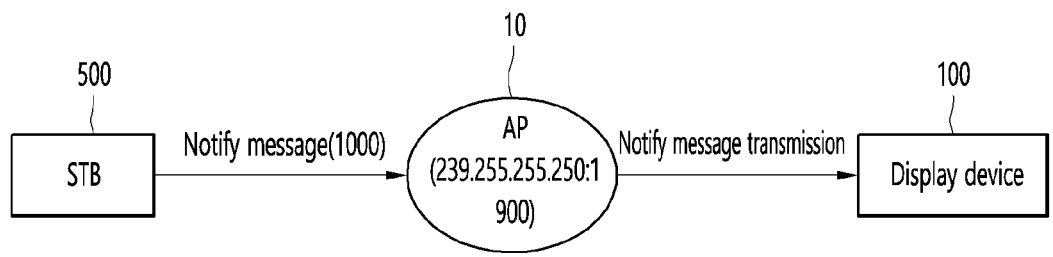
FIG. 10 is a view illustrating a process of, by a set-top box, searching for a display device, for wireless network connection, according to an embodiment of the present disclosure.

FIG. 10 is a view illustrating a process of, by a set-top box, searching for a display device, for wireless network connection, according to an embodiment of the present disclosure.

A communication protocol used for wireless network connection between the set-top box 500 and the display device 100 may be a simple service discovery protocol (SSDP).

The set-top box 500 may transmit a Notify message to an access point 10 in a multicast manner.

The Notify message 1000 may be a message transmitted to search for the display device 100 which is an object to be connected.

The Notify message 1000 will be described with reference to FIG. 11.

Figures 11, 12:
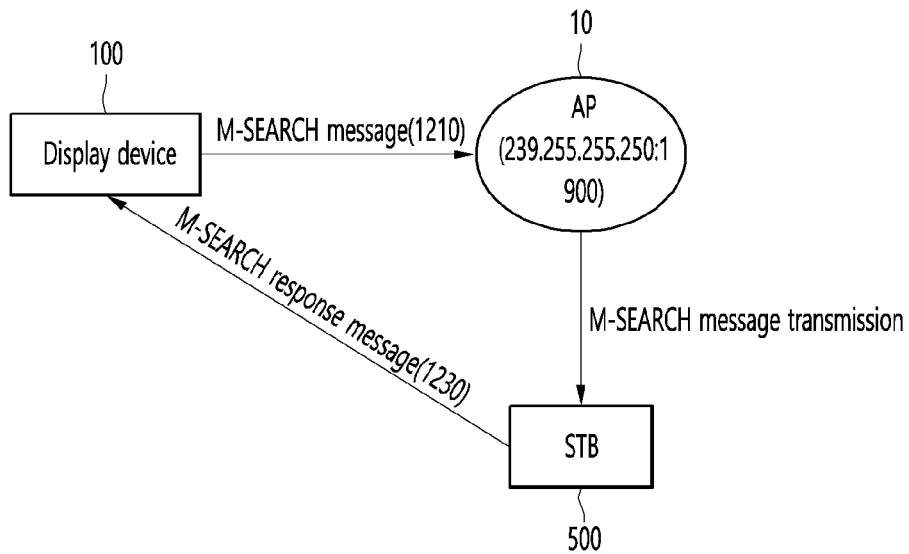
FIG. 11 is a view illustrating the configuration of a Notify message transmitted by a set-top box in a multicast manner according to an embodiment of the present disclosure.
FIG. 12 is a view illustrating a process of, by a display device, searching for a set-top box for wireless network connection, according to an embodiment of the present disclosure.

FIG. 11 is a view illustrating the configuration of a Notify message transmitted by a set-top box in a multicast manner according to an embodiment of the present disclosure.

The Notify message 1000 may include a host address 1101, manufacturer information 1103 of the set-top box 500, transmission activation information 1105, an IP address 1107 of the set-top box 500, identifier information 1109 of the set-top box 500, a message transmission period 1111, and server information 1113.

The host address 1101 may be an IP address of the access point 10 connected with the set-top box 500.

The manufacturer information 1103 of the set-top box may include the name of the manufacturer who has manufactured the set-top box 500.

The transmission activation information 1105 may indicate that transmission of the Notify message 1000 is maintained, through the SSDP.

The identifier information 1109 of the set-top box 500 may include an identifier for identifying the set-top box 500.

The transmission period 1111 of the message may include a period in which the Notify message is transmitted in a multicast manner.

The server information 1113 may include information on a sever interworking with the set-top box 500.

FIG. 10 will be described again.

The access point 10 may be a wireless router and the host IP address of the access point 10 may be (239.255.255.250: 1900).

The access point 10 may transmit the Notify message 1000 received from the set-top box 500 to the display device 100.

The display device 100 is in a user datagram protocol (UDP) listen state. That is, the display device 100 may wait for a request message for connection with the set-top box 500.

The display device 100 may be connected to a network through the same access point as the set-top box 500, upon receiving the Notify message 1000 while waiting.

FIG. 12 is a view illustrating a process of, by a display device, searching for a set-top box for wireless network connection, according to an embodiment of the present disclosure.

A communication protocol used for wireless network connection between the set-top box 500 and the display device 100 may be a simple service discovery protocol (SSDP).

The display device 100 may transmit a M-SEARCH message 1210 to the access point 10 in a multicast manner.

The M-SEARCH message 1210 may be a message transmitted to search for the set-top box 500 which is an object to be connected.

The M-SEARCH message 1210 will be described with reference to FIG. 13a.

FIG. 13a is a view illustrating the content of a M-SEARCH message according to an embodiment of the present disclosure.

The M-SEARCH message 1210 may include a host address 1301, search information 1303, a transmission period 1305 of the M-SEARCH message 1210 and search target information 1307.

The host address 1301 may be an IP address of the access point 10.

The search information 1303 may be information indicating that the M-SEARCH message 1210 is a message for searching for a device.

The transmission period 1305 of the M-SEARCH message 1210 may include a period in which the M-SEARCH message 1210 is transmitted in a multicast manner.

The search target information 1307 may include information on the set-top box 500 to be searched.

FIG. 12 will be described again.

The access point 10 may transmit the M-SEARCH message 1210 received from the display device 100 to the set-top box 500.

The set-top box 500 is in a user datagram protocol (UDP) listen state. That is, the set-top box 500 may wait for a request message for connection with the display device 100.

The set-top box 500 may generate a M-SEARCH response message 1230 upon receiving the M-SEARCH message 1210 from the access point 10.

The M-SEARCH response message 1230 may be a message for providing information on the set-top box 500 to the display device 100, in response to the M-SEARCH message 1210 of the display device 100.

The set-top box 500 may transmit the M-SEARCH response message 1230 to the display device 100 in a unicast manner.

The configuration of the M-SEARCH response message 1230 will be described with reference to FIG. 13b.

FIG. 13b is a view illustrating the configuration of a M-SEARCH response message.

The M-SEARCH response message 1230 may include a host address 1311, manufacturer information 1313 of the set-top box 500, a manufacture date 1315, an IP address 1317 indicating the access position of the set-top box 500, identifier information 1319 of the set-top box 500, a transmission period 1321 of the M-SEARCH response message 1230, and server information 1323 of the set-top box 500.

The host address 1311 may be an IP address of the access point 10.

The manufacturer information 1313 of the set-top box 500 may include the name of the manufacture who has manufactured the set-top box 500.

The transmission period 1321 of the M-SEARCH response message 1230 may indicate a period in which the M-SEARCH response message 1230 is transmitted.

FIG. 14 is a view illustrating the configuration of a message exchanged between a display device and a set-top box according to an embodiment of the present disclosure.

The display device 100 and the set-top box 500 may exchange a message 1400 through a transmission control protocol (TCP).

The message 1400 may include a prefix field 1410, a version field 1420, a type field 1430, a command field 1440, a response code field 1450, and a body length field 1460.

The length of the prefix field 1410 is 3 bytes and the value thereof may be SSC. The prefix field 1410 may indicate that exchange of the message 1400 between the display device 100 and the set-top box 500 is performed through the transmission control protocol.

The version field 1420 may indicate a version and the length thereof may be 2 bytes.

The type field 1430 may identify the type of the message. When the value of the type field 1430 is 1, this may indicate a request message and, when the value of the type field 1430 is 0, this may indicate a response message.

The length of the type field 1430 may be 1 byte.

The length of the command field 1440 may be 4 bytes and may indicate whether the display device 100 transmits a key code to the set-top box 500 or receives information from the set-top box 500.

For example, when the value of the command field 1440 is 0001, this may indicate that the display device 100 transmits the key code received from the remote control device 200 to the set-top box 500.

In addition, when the value of the command field 1440 is 0002, this may indicate that the display device 100 obtains information on a current channel from the set-top box 500.

The length of the command field 1440 may be 4 bytes.

The response code field 1450 may have a value of 0000 when the value of the type field 1430 is 0. That is, when the message is a request message, the value of the response code field 1450 may be 0000.

The length of the response code field 1450 may be 4 bytes.

The body length field 1460 may indicate the length of a body when the body is present. The body may include information on a specific command between the display device 100 and the set-top box 500.

FIGS. 15 and 16 are views illustrating detailed examples of the message of FIG. 14.

A first request message 1510 of FIG. 15 may be a message for transmitting a command corresponding to selectin of an Enter key from the display device 100 to the set-top box 500.

A first response message 1530 may be a message responding to the first request message 1510.

A second request message 1610 of FIG. 16 is a message for requesting information on a channel currently being viewed by the display device 100, and a second response message 1610 may be a message including information on a current channel in response to the second request message 1610.

FIGS. 17 to 20 are views illustrating examples of controlling operation of a set-top box using a remote control device, according to various embodiments of the present disclosure.

Figure 17:
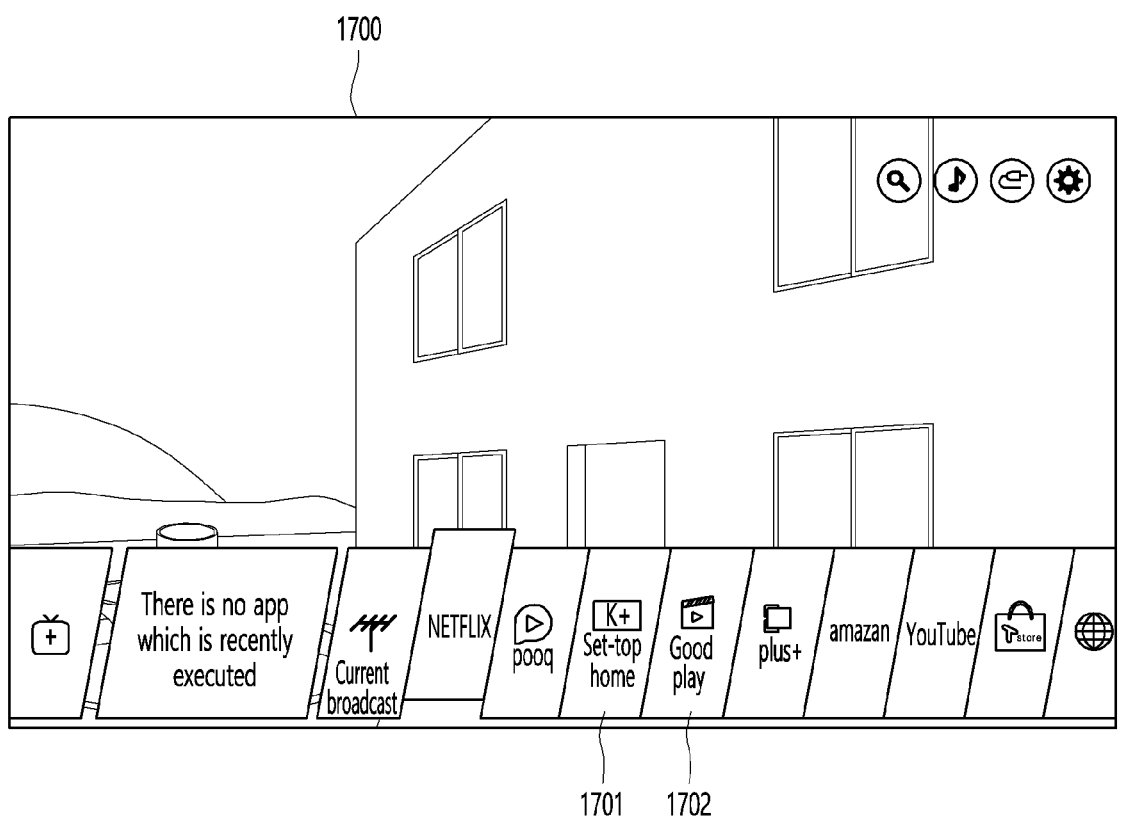
FIGS. 17 to 20 are views illustrating examples of controlling operation of a set-top box using a remote control device, according to various embodiments of the present disclosure.

First, referring to FIG. 17, the display device 100 may display a home screen 1700.

The home screen 1700 may include broadcast content which is being viewed, an icon corresponding to an application installed in the display device 100, and icons 1701 and 1702 corresponding to applications installed in the set-top box 500.

That is, a first icon 1701 and a second icon 1702 included in the home screen 1700 may correspond to the applications installed in the set-top box 500, not the display device 100.

The first icon 1701 may provide the home screen of the set-top box 500.

The display device 100 may transmit a request to output the home screen of the set-top box 500 to the set-top box 500 through the HDMI-CEC function, when a command for selecting the first icon 1701 is received from the remote control device 200.

Figure 18:
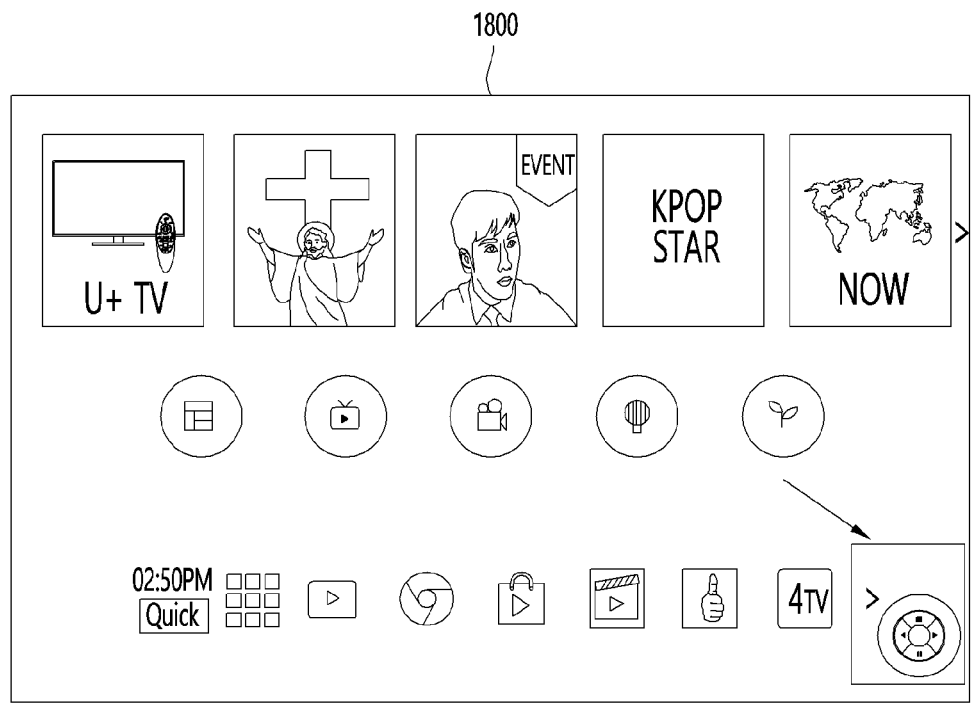

The set-top box 500 may output a home screen 1800 thereof as shown in FIG. 18, upon receiving the request to output the home screen.

The display device 100 may receive the home screen 1800 output by the set-top box 500 and display the home screen 1800 of the set-top box 500 through the display 180.

The second icon 1702 may be an icon for providing an application market capable of downloading an application.

The display device 100 may transmit a request to execute a market application installed in the set-top box 500 to the set-top box 500 through the HDMI-CEC function, upon receiving a command for selecting the second icon 1702 from the remote control device 200.

The set-top box 500 may execute the market application and output the executed execution screen, upon receiving the request to execute the market application.

Figure 19:
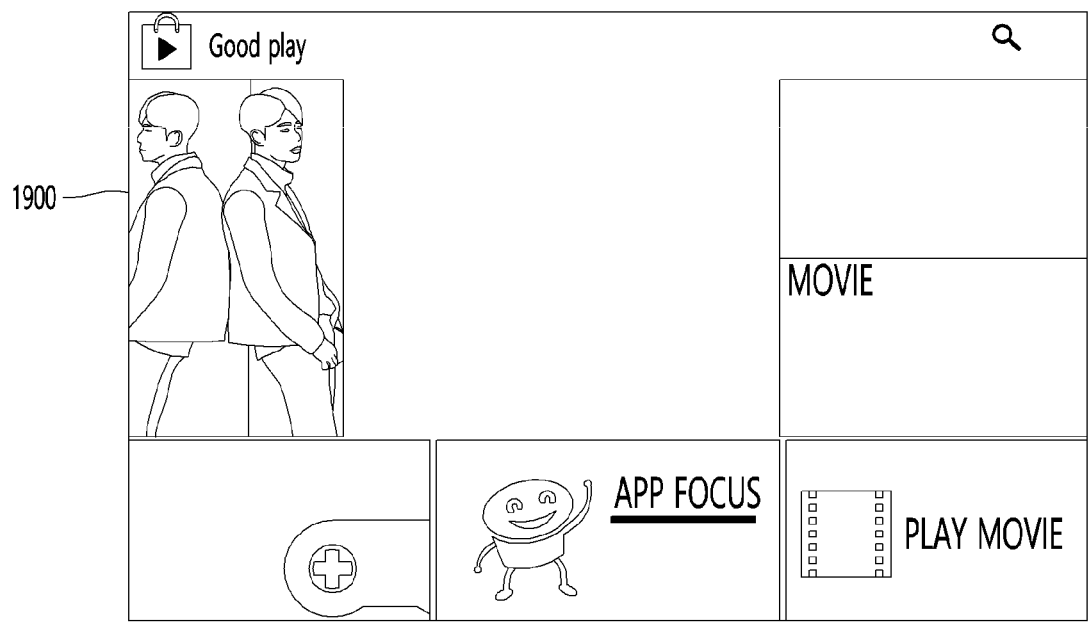

The display device 100 may receive the execution screen output by the set-top box 500 and output the received execution screen 1900 through the display 180 (FIG. 19).

Figure 20:
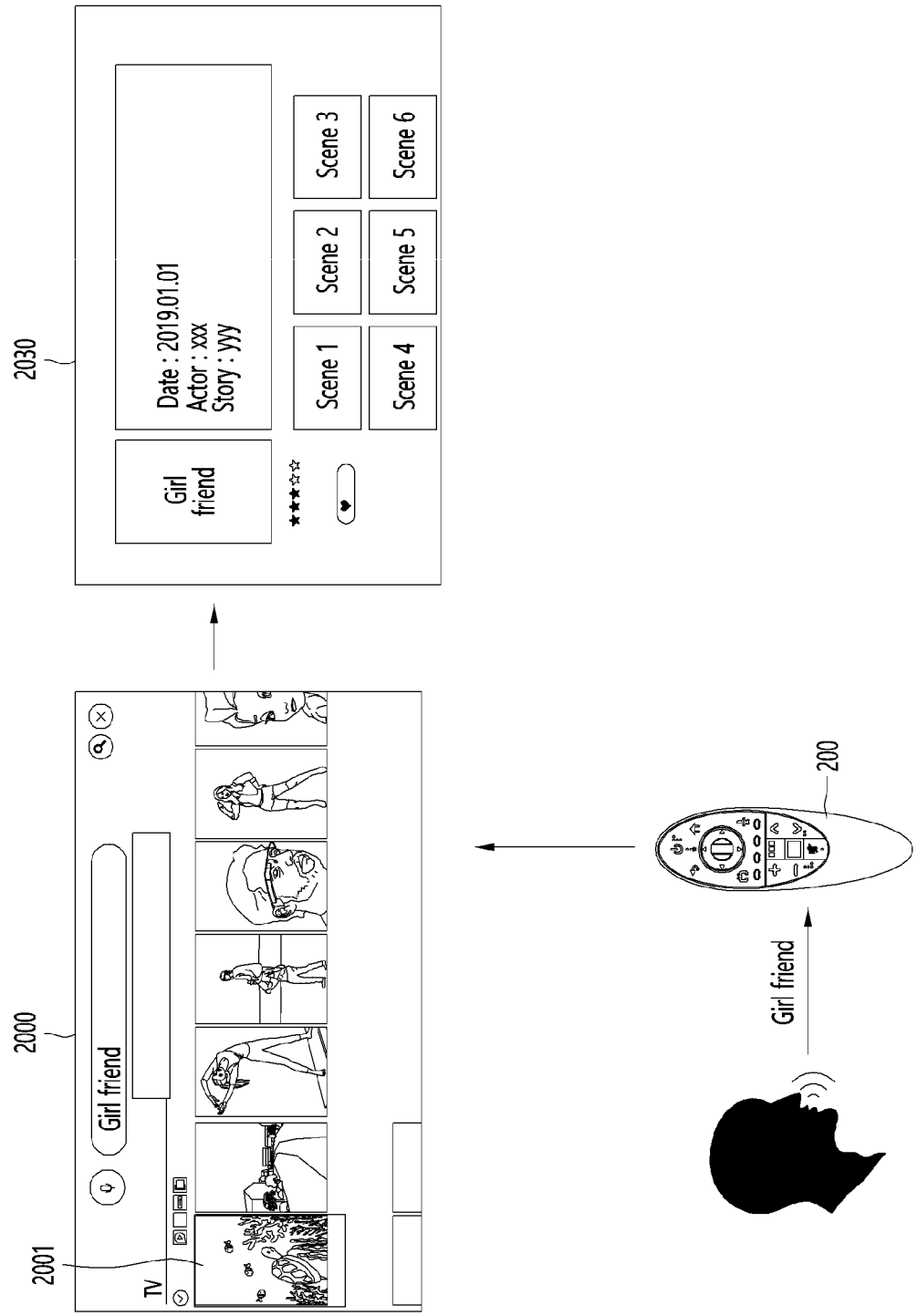

Referring to FIG. 20, the display device 100 may display a voice search screen 2000.

The remote control device 200 may receive a command <Girl friend> uttered by a user.

The remote control device 200 may transmit the received uttered command to the display device 100.

The display device 100 may search for content corresponding to the received uttered command and display a result of search.

When receiving a command for selecting content 2001 included in the result of search, the display device 100 may request detailed information of the selected content from the set-top box 500.

The set-top box 500 may output the detailed information according to the received request and transmit the same to the display device 100.

The display device 100 may display a detailed information screen 2030 including detailed information received from the set-top box 500.

According to an embodiment of the present disclosure, the user may experience the effect of improving accessibility to the content capable of being provided only by the set-top box 500, by manipulating the remote control device 200 of the display device 100.

Figure 21:
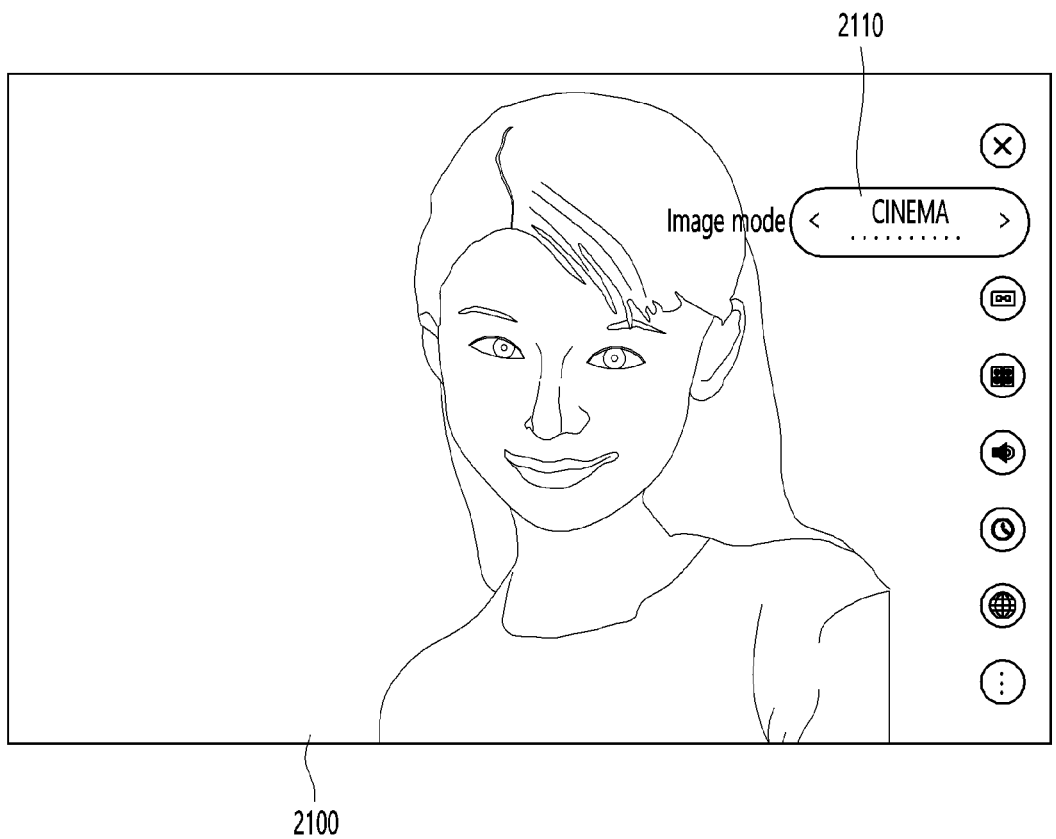
FIGS. 21 and 22 are views illustrating examples of controlling functions of a display device, based on information on content input to a set-top box, according to an embodiment of the present disclosure.
Figure 22:
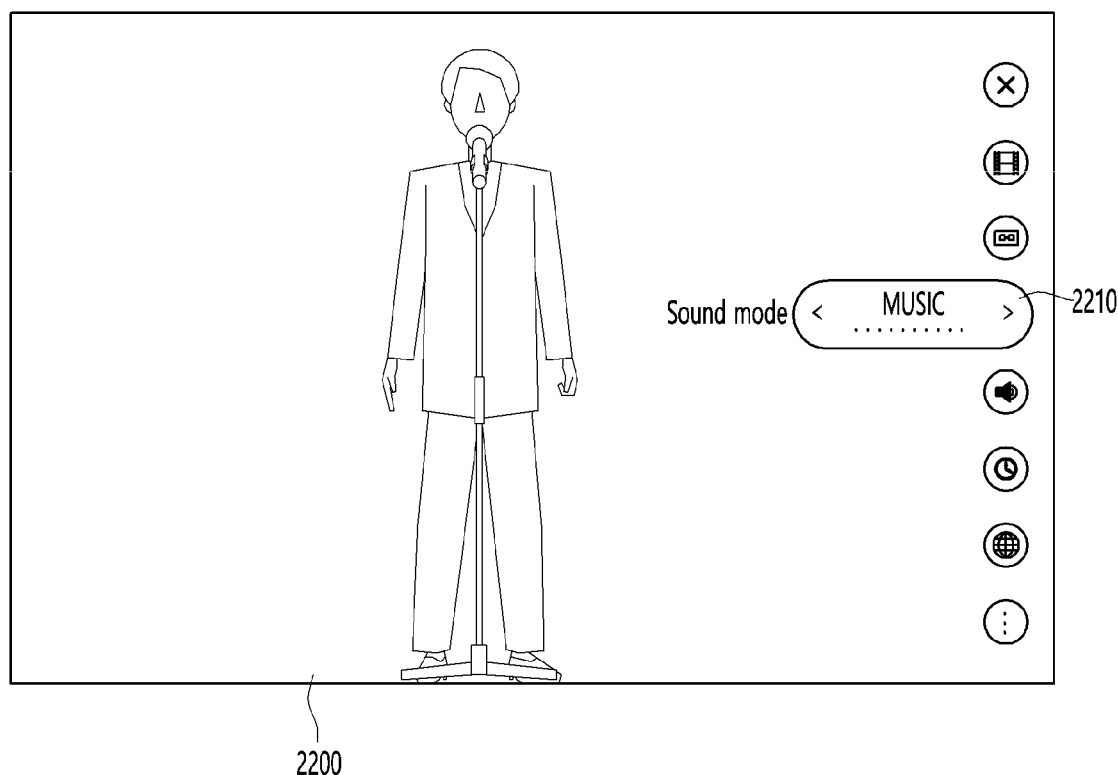

FIGS. 21 and 22 are views illustrating examples of controlling functions of a display device, based on information on content input to a set-top box, according to an embodiment of the present disclosure.

Referring to FIG. 21, the display device 100 may play back content 2100. The content 2100 may be content 2100 input through the set-top box 500.

The display device 100 may further display function icons indicating functions provided by the display device 100.

One of the function icons may include an image mode icon 2110 for switching the image mode of the content 2100.

The set-top box 500 may identify the genre of the content 2100 which is currently being output by the display device 100.

The set-top box 500 may control the image mode of the content 2100 according to the identified genre of the content 2100. For example, when the identified genre of the content 2100 is movie, the set-top box 500 may transmit a request to set the playback mode of the content 2100 to a cinema mode to the display device 100.

The display device 100 may switch the playback mode of the content 2100 to the cinema mode, upon receiving the request to set the playback mode to the cinema mode.

As the playback mode of the content 2100 is switched to the cinema mode, the image mode icon 2110 may indicate that the current playback mode of the content 2100 is a cinema mode.

In another embodiment, the display device 100 may identify the genre of the content 2100 input through the set-top box 500. The display device 100 may receive the genre information of the content 2100, which is currently being played back, from the set-top box 500.

When the identified genre of the content 2100 is movie, the display device 100 may automatically switch the image mode to the cinema mode.

Referring to FIG. 22, the display device 100 is playing back audio and music image 2200 input through the set-top box 500.

Any one of the function icons may include a sound mode icon 2210 capable of switching the sound mode of the content.

The set-top box 500 may identify the genre of the music image 2200 which is currently being output by the display device 100.

When the identified genre of the music image 2200 is music, the set-top box 500 may transmit a request to set the playback mode of the content to a music mode to the display device 100.

The display device 100 may switch the playback mode of the music image 2200 to the music mode, upon receiving the request to set the playback mode to the music mode.

As the playback mode of the content 2100 is switched to the cinema mode, the sound mode icon 2210 may indicate that the current sound mode of the music image 2200 is a music mode.

In another embodiment, the display device 100 may identify the genre of the music image 2210 input through the set-top box 500. The display device 100 may receive the genre information of the music image 2210, which is currently being played back, from the set-top box 500.

When the identified genre of the music image 2210 is music video, the display device 100 may automatically switch the sound mode to the music mode.

Figure 23:
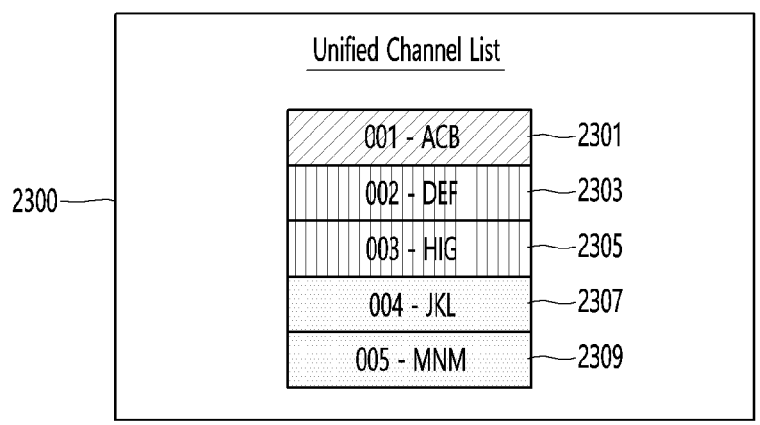
FIG. 23 is a view illustrating a unified channel list in which channels provided by a set-top box and channels provided by a display device are unified according to an embodiment of the present disclosure.

FIG. 23 is a view illustrating a unified channel list in which channels provided by a set-top box and channels provided by a display device are unified according to an embodiment of the present disclosure.

Referring to FIG. 23, the display device 100 may display a unified channel list 2300. The unified channel list 2300 may be displayed as a channel list display command is received from the remote control device 200.

The unified channel list 2300 may include a plurality of channels 2301 to 2309.

The first channel 2301 is capable of being provided by both the display device 100 and the set-top box 500. The channel capable of being provided may mean that the channel is capable of being tuned.

The second channel 2303 and the third channel 2305 are capable of being provided by only the display device 100.

The fourth channel 2307 and the fifth channel 2309 are capable of being provided by only the set-top box 500.

The channel capable of being provided by both the display device 100 and the set-top box 500, the channel capable of being provided by only the display device 100, and the channel capable of being provided by only the set-top box 500 may be displayed to be distinguished from one another.

The display device 100 may switch external input from the set-top box 500 to the display device 100, when a command for selecting the second channel 2303 or the third channel 2305 is received while the channel input through the set-top box 500 is reproduced.

The display device 100 may switch external input from the display device 100 to the set-top box 500, when a command for selecting the fourth channel 2307 or the fifth channel 2309 is received while the channel input through the tuner 131 of the display device 100 is reproduced.

By providing the unified channel list 2300, user's accessibility to the channel may be greatly improved.

According to one embodiment of the present disclosure, the above-described method may be implemented as code that can be written to a processor-readable recording medium and can thus be read by a processor. Examples of the processor-readable recording medium include a ROM, a RAM, a CD-ROM, a magnetic tape, a floppy disk, optical data storage, and a carrier wave (e.g., data transmission over the Internet).

The display device described above should not be limited to configurations and methods of the above-described embodiments, and all or some of the embodiments may be selectively combined with one another to achieve various alterations.

The invention claimed is:

1. A display device comprising:
a display;
an external device interface; and
a controller configured to:
connect with a set-top box through the external device interface,
transmit display device information to the set-top box through the external device interface, wherein the display device information indicates that a High Definition Multimedia Interface-Consumer Electronics Control (HDMI-CEC) function of the display device is turned off, wherein the HDMI-CEC function is a function to control the set-top box, which is connected to an HDMI terminal included in the external device interface, by a remote control device of the display device,
receive set-top box information from the set-top box through the external device interface, wherein the set-top box information includes a CEC field indicating whether a HDMI-CEC function of the set-top box is turned on or off,
in response to the CEC field indicating the HDMI-CEC function of the set-top box is turned on, turn on the HDMI-CEC function of the display device, and
in response to the CEC field indicating the HDMI-CEC function of the set-top box is turned off, maintain the HDMI-CEC function of the display device to be turned off,
wherein the controller is further configured to:
receive a power-on command from the set-top box when a power of the set-top box is turned on,
turn on a power of the display device according to the received power-on command and when the HDMI-CEC function of the display device is turned on,
receive a power-off command from the set-top box when the power of the set-top box is turned off, and
turn off the power of the display device according to the received power-off command and when the HDMI-CEC function of the display device is turned on.

2. The display device of claim 1,
wherein the controller is configured to display a setting menu on the display for setting the HDMI-CEC function of the set-top box, and
wherein the setting menu includes a guide indicating that power operations of the set-top box and the display device are equally performed when the HDMI-CEC function of the set-top box is turned on.

3. The display device of claim 1, wherein the set-top box information includes a manufacturer of the set-top box, a model name of the set-top box and extra information including the CEC field.

4. The display device of claim 3, wherein the extra information includes a prefix field identifying whether the extra information is present the CEC field.

5. The display device of claim 4, wherein the controller is configured to indicate that the HDMI-CEC function of the set-top box is turned off when a value of the CEC function field is a first value and indicate that the HDMI-CEC function of the set-top box is turned on when the value of the CEC function field is a second value.

6. The display device of claim 1, wherein the display device information includes information indicating that the HDMI-CEC function is capable of being automatically turned on.

7. The display device of claim 1,
wherein the set-top box information includes a data packet including a plurality of byte fields, and
wherein the CEC field is one of the plurality of byte fields.

8. The display device of claim 7, wherein the plurality of byte fields further include:
an eight byte field indicating a vendor name of the set-top box,
a six byte field indicating a model name of the set-top box,
a four byte field including the CEC field, and
a one byte field indicating source information of the set-top box.

9. The display device of claim 8, wherein the plurality of byte fields further include:
a one byte space field between the six byte field indicating the model name and the four byte field including the CEC field, and
wherein the one byte space field distinguishes between the six byte field indicating the model name and the four byte field including the CEC field.

10. A method of operating a display device, the method comprising:
connecting with a set-top box through an external device interface of the display device;
transmitting, via a controller of the display device, display device information to the set-top box through the external device interface, wherein the display device information indicates that a High Definition Multimedia Interface-Consumer Electronics Control (HDMI-CEC) function of the display device is turned off, wherein the HDMI-CEC function is a function to control the set-top box, which is connected to an HDMI terminal included in the external device interface, by a remote control device of the display device;

receiving, via the controller, set-top box information from the set-top box through the external device interface, wherein the set-top box information includes a CEC field indicating whether a HDMI-CEC function of the set-top box is turned on or off;

in response to the CEC field indicating the HDMI-CEC function of the set-top box is turned on, turning on, via the controller, the HDMI-CEC function of the display device; and in response to the CEC field indicating the HDMI-CEC function of the set-top box is turned off, maintaining, via the controller, the HDMI-CEC function of the display device to be turned off, wherein the method further comprises:

receiving a power-on command from the set-top box when a power of the set-top box is turned on;

turning on a power of the display device according to the received power-on command and when the HDMI-CEC function of the display device is turned on;

receiving a power-off command from the set-top box when the power of the set-top box is turned off; and turning off the power of the display device according to the received power-off command and when the HDMI-CEC function of the display device is turned on.

11. The method of claim 10, further comprising displaying a setting menu for setting the HDMI-CEC function of the set-top box, wherein the setting menu includes a guide indicating that power operations of the set-top box and the display device are equally performed when the HDMI-CEC function of the set-top box is turned on.

12. The method of claim 10, wherein the set-top box information includes a manufacturer of the set-top box, a model name of the set-top box and extra information including the CEC field.

13. The method of claim 12, wherein the extra information further includes a prefix field identifying whether the extra information is present.

14. The method of claim 13, wherein a first value of the CEC function field indicates that the HDMI-CEC function of the set-top box is turned off and a second value of the CEC function field indicates that the HDMI-CEC function of the set-top box is turned on.

15. The method of claim 10, wherein the set-top box information includes a data packet including a plurality of byte fields, and wherein the CEC field is one of the plurality of byte fields.

16. The method of claim 15, wherein the plurality of byte fields further include:

an eight byte field indicating a vendor name of the set-top box, a six byte field indicating a model name of the set-top box, a four byte field including the CEC field, and a one byte field indicating source information of the set-top box.

\* \* \* \* \*